United States Patent [19]

Dreisin

[11] Patent Number: 4,794,009

[45] Date of Patent: Dec. 27, 1988

[54] METHOD FOR FORMING FILLED DOUGH PRODUCTS

[76] Inventor: Ilya Dreisin, 253 W. 57 St. #1257, New York, N.Y. 10019

[21] Appl. No.: 38,003

[22] Filed: Apr. 14, 1987

Related U.S. Application Data

[62] Division of Ser. No. 798,222, Nov. 14, 1985, Pat. No. 4,685,874.

[51] Int. Cl.⁴ .............................................. A21C 3/04
[52] U.S. Cl. ...................................... 426/283; 426/89
[58] Field of Search ........................... 426/283, 284, 94

[56] References Cited

U.S. PATENT DOCUMENTS 3,572,259  3/1971  Hayashi ................................. 426/94
4,251,201  2/1981  Krysiak ............................... 426/283

*Primary Examiner*—Donald E. Czaja
*Assistant Examiner*—Mary S. Mims

[57] ABSTRACT

Method of and apparatus for forming filled dough products comprising: piston extruders for pumping dough and filling to measuring devices which extrudes external dough tube with internal filling through a die head so that part of the dough tube of one item is extruded without filling, a twisting device for turning just extruded item around its longitudinal axis and twisting the empty part of the dough tube, and pinching device for forming closing and separating ends of the items.

2 Claims, 7 Drawing Sheets

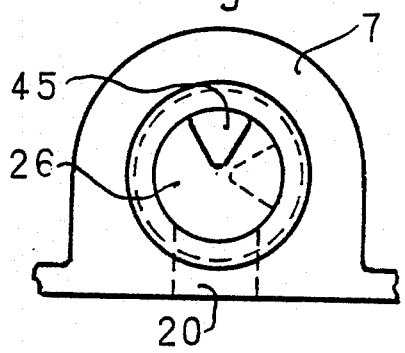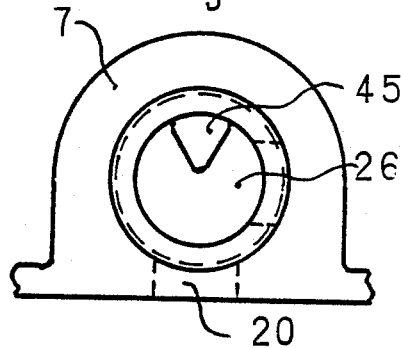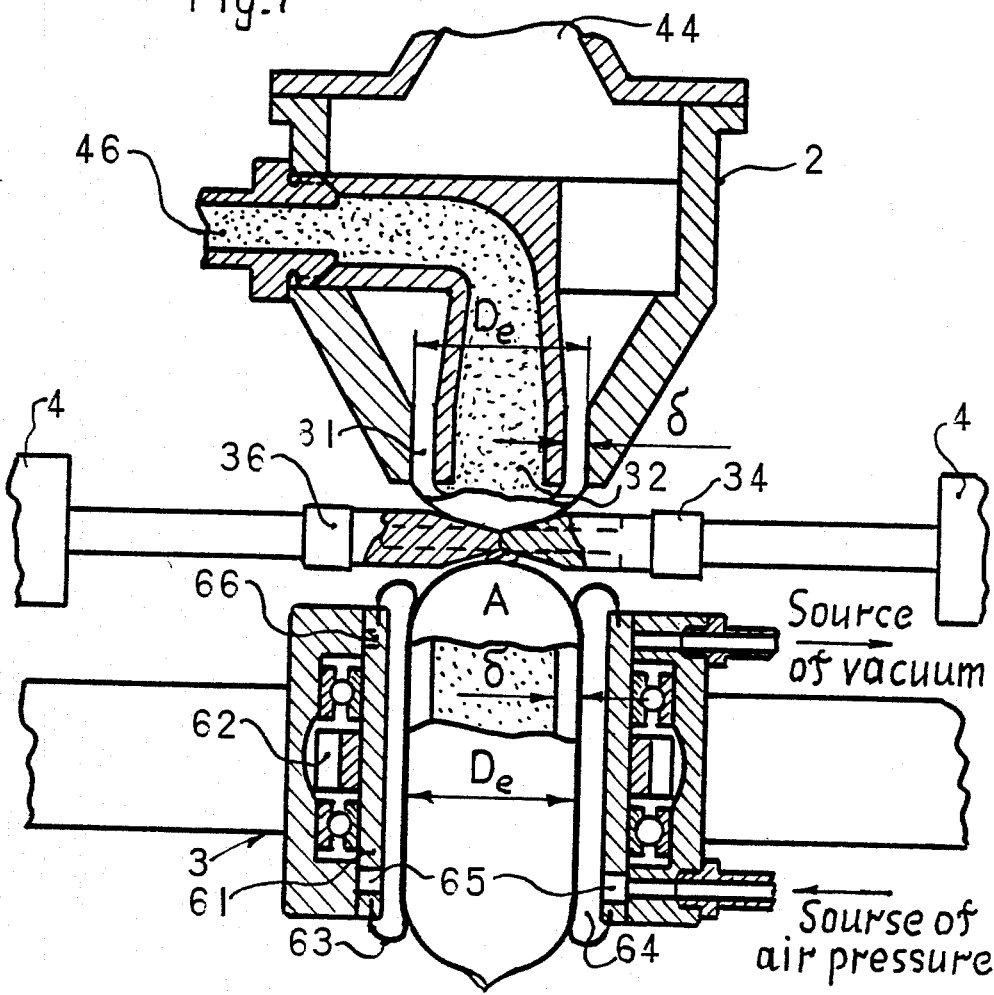

METHOD FOR FORMING FILLED DOUGH PRODUCTS

This is a Division of the application Ser. No. 06.798.222 filed 11/14/85 now U.S. Pat. No. 4,685,874; issued Aug. 11, 1987.

BACKGROUND OF THE INVENTION

The invention relates to a novel method and improved version of the apparatus for intermittently forming filled dough items as a wonton, pirojhok, and the like. Typically such products are made manually by wrapping a sheet of dough around a filling and the items thus made are cooked or fried for eventual consumption.

U.S. Pat. No. 4,259,051 discloses extrusion apparatus for food material which produces dough tube with filling such as ketchup or sour cream. U.S. Pat. No. 3,917,863 discloses method and apparatus for intermittently forming an annular filled food ring. This apparatus is intermittently extruded dough ring with inner filling so that parts of dough for each item are extruded without filling. U.S. Pat. No.3,615,675 discloses an extruder that produces a dough tube filled with a suitable food material which intermittently is divided into pieces. U.S. Pat. No. 3,572,259 describes apparatus for molding dough materials with filling from bar shapes into spherical shapes. U.S. Pat. No. 3,541,946 discloses a device for forming a cereal shell and simultaneously filling the shell with a suitable flller. The continuous tube of cereal material is the divided into pieces Russian certificate of invention No. 683703 discloses an apparatus for intermittently extrusion semi-finished articles from dough with filling. The apparatus has a cuter to close ends of the articles. It is intermittently extruded external dough tube with inner filling so that part of the dough tube is extruded without filling, then the cuter closed and separated the articles. In this case the closed articles still have unsatisfactory shape.

These apparatuses have large dimensions and high cost.

OBJECTS AND SUMMARY OF THE INVENTION

It is an object of the present invention to provide a novel method and improved apparatus for forming filled dough products. It is another object of the present invention to provide a small apparatus which is intended to be used by restaurants and similar businesses. These objects of the invention are obtained by providing an apparatus for forming filled dough products comprising means for extrusion of predetermined quantity of external dough tube with internal filling so that a part of the external dough tube is extruded without filling; a twisting device for turning a just extruded dough tube with filling around its longitudinal axis and twisting it in a place without filling and a pinching device for closing ends of the adjacent items and separating of them.

BRIEF DESCRIPTION OF THE DAAWINGS

FIG. 1 is a principal side view of the apparatus.
FIG. 2 is a diagram of the apparatus.
FIG. 3 is a partial sectional view of the measuring device for filling.
FIG. 4 is a top view of mechanisms for turning of measuring cylinders and controlling of the twisting device.
FIG. 5 is a view at arrow B, (FIG. 3) of the measuring device in a position "Taking a Dose."
FIG. 6 is a view at an arrow B (FIG. 3) of the measuring device in a position "Extruding a Dose."
FIG. 7 is a sectonal view at a line II FIG. 1.
FIG. 8 is a partial sectional view of a mechanism for controlling of a piston of the measuring device for a filling.
FIG. 9 is a cross sectional view along the line II II FIG. 8.
FIG. 10 is a top view of the pinching cams.
FIG. 11 is a diagram of the another version of the apparatus.

DESCRIPTION OF THE PREFERRED EMBODIMENT

Figure 1:
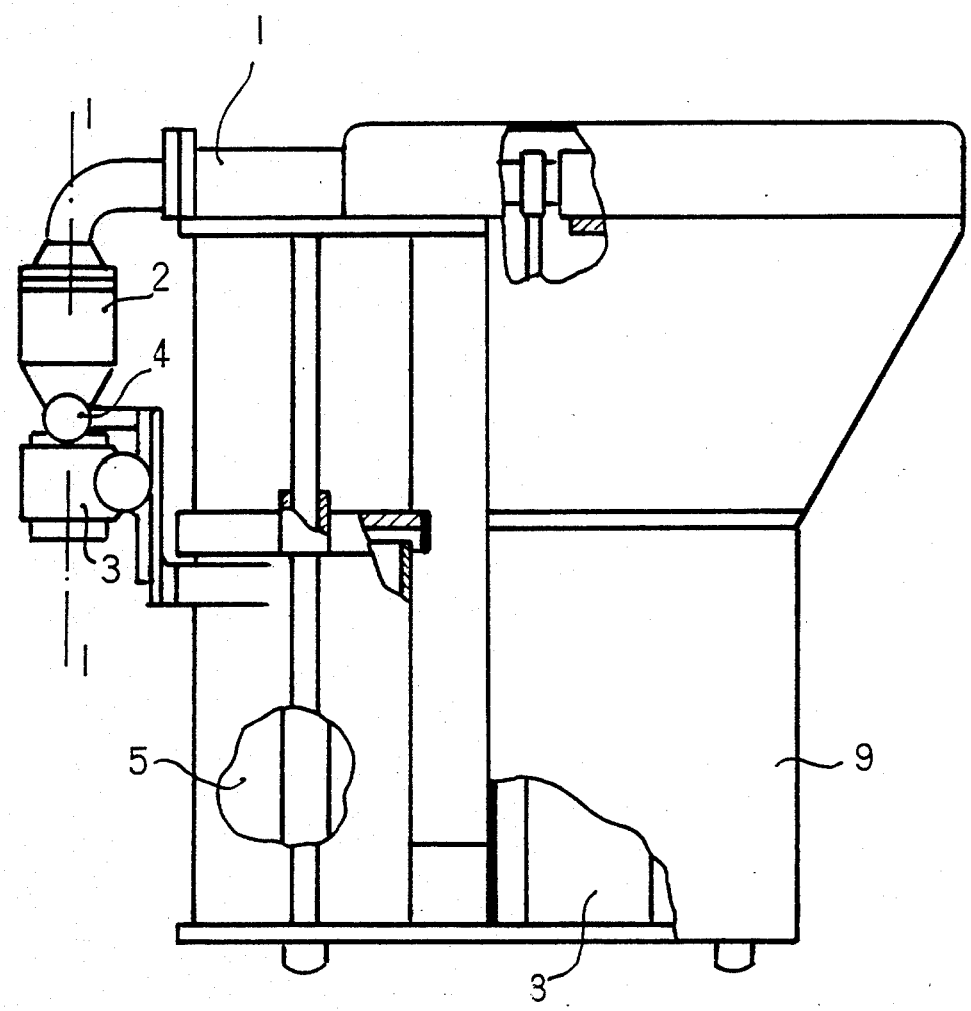
Figure 2:
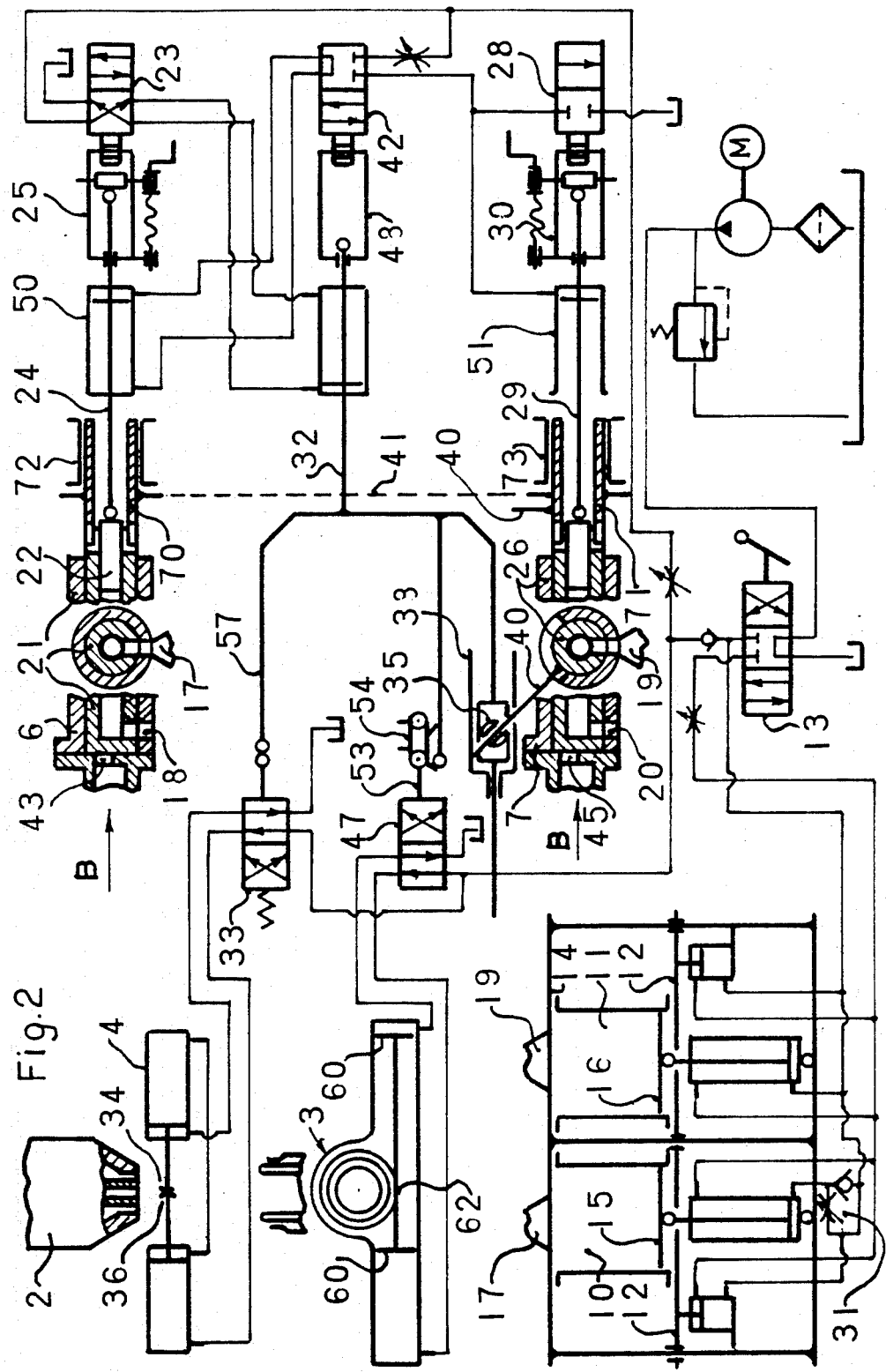
Figure 3:
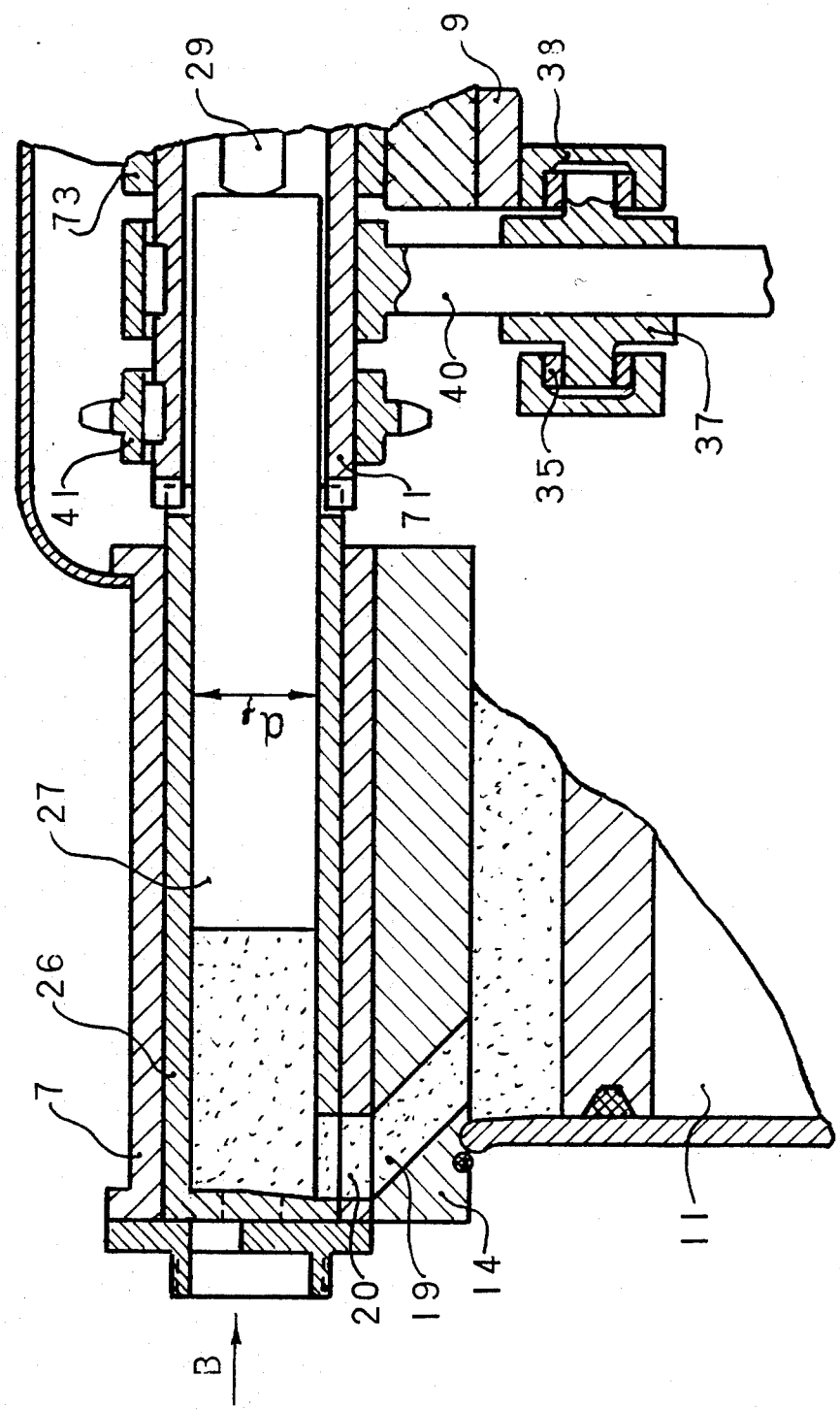
Figure 4:
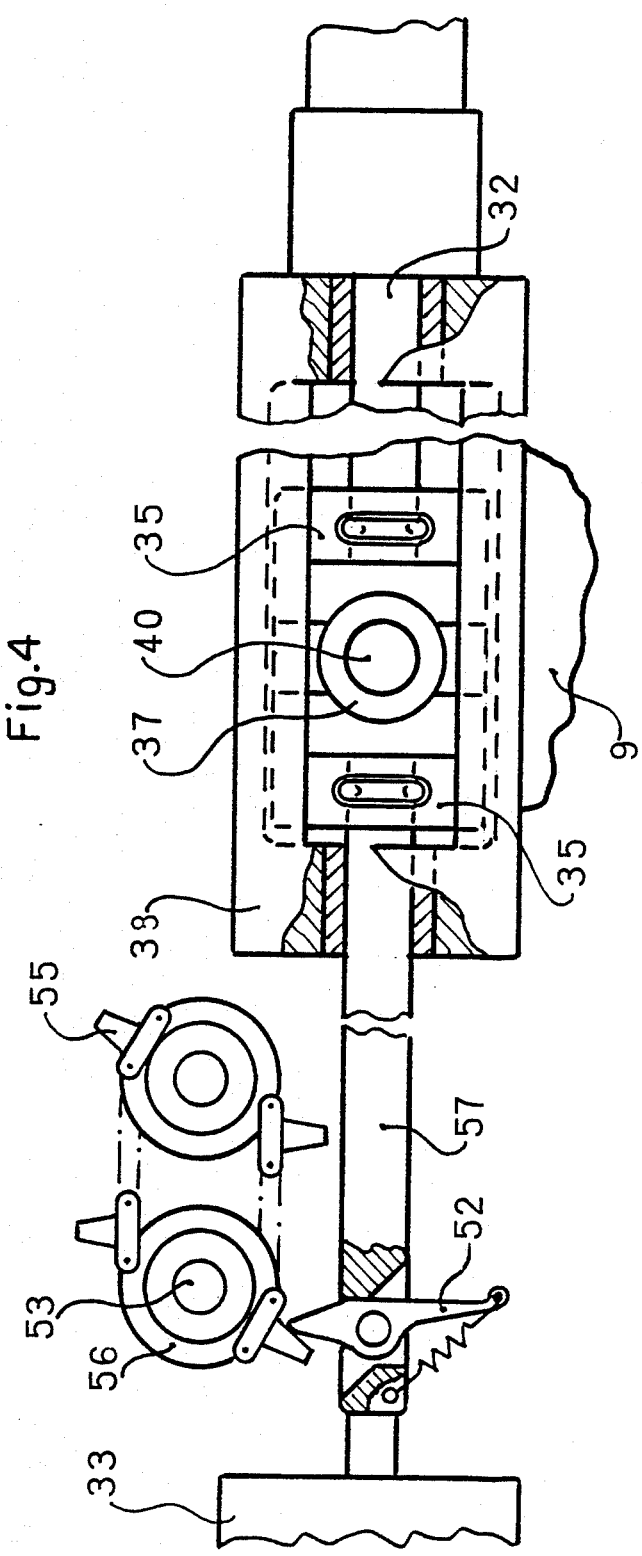
Figure 8:
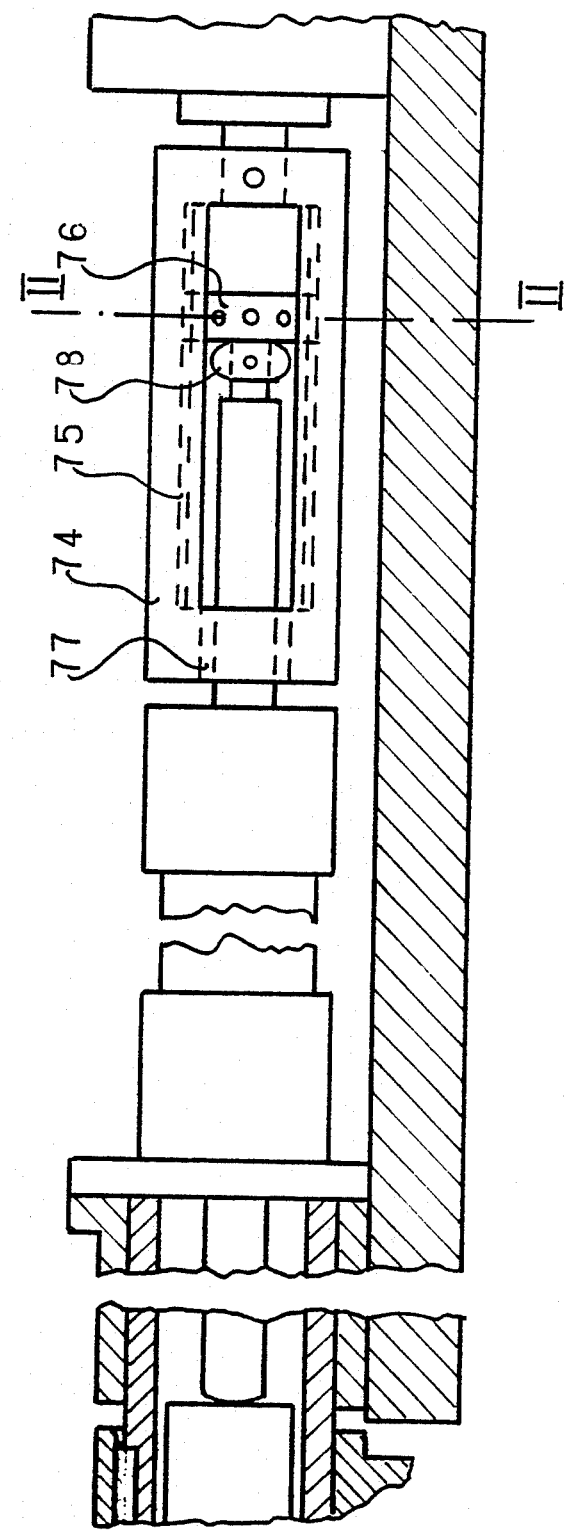
Figure 9:
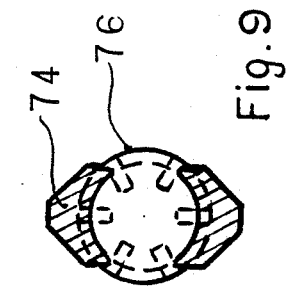
Figure 10:
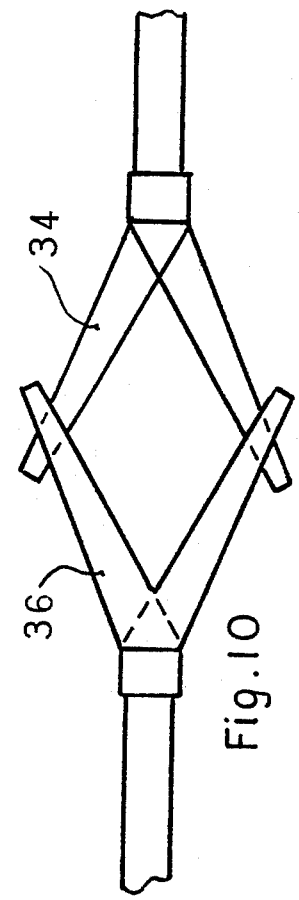

Referring to the drawings, reference number 1 indicates means for extruding an external dough tube with internal filling through die head 2. Th apparatus of the present invention also includes: the twisting device 3, the pinching device 4, and the pumping device 5 which provides pumping dough and filling to the measuring devices 6 and 7 of the extrusion means 1. The apparatus has the hydraulic control system 8. All units are mounted on the body 9. As it is shown on FIGS. 2 and 11, boards 14 and 14a are united by ties 85. The board 12 is secured to the roads of the hydraulic lifters 86, which fixed to the ties 85, and has plain bearing 87. If the valve 13 is in the left position, the board 12 and roads of the hydraulic cylinders 88 which secured to the board 14a, are in the lower position. As a result, product cylinders 10 and 11 can be placed on the board 12 between the ties 85, or can be removed from the board 12 together with product pistons 15 and 16, because pistons 15 and 16 are not secured to the roads of the cylinders 88. The boards 12, 14 and 14a, ties 85, cylinders 88, replaceable product cylinders 10 and 11 with the pistons 15 and 16 are arranged as the piston feeder for dough with the dough outlet 17 and as the piston feeder for filling with the filling outlet 19. Cylinders 10 and 11 are containers outside of the apparatus. They must be fed outside of the apparatus. Necessary number of these cylinders with different products can be stored in a suitable place. They are interchangeable with each other. The apparatus shown in FIG. 1 through FIG. 10 operates in the following manner: Easy replaceable product cylinders 10 with dough, and 11 with filling together with pistons 15 and 16 are put on the movable board 12 as shown on FIG. 2. Dough and filling are preliminarily vacuum-treated. The valve 13 is switched to the right position and replaceable product cylinders are squeezed between boards 12 and 14. Simultaneously product pistons 15 and 16 pump dough through the dough outlet 17 to the inlet 18 of the measuring device 6, and filling through the filling outlet 19 to the inlet 20 of the measuring device 7. It is understandable, that in another embodiment the apparatus can operate with any sources for pumping dough and filling to measuring devices 6 and 7. As it is shown on FIG. 2 filling fed to the rotary measuring cylinder 26 pushes the plunger 27 (FIG. 3) which switches the valve 28 in the position shown on FIG. 2 by the rod 29 and the dose controller 30. The valve 31 provides the earlier feeding of the cylinder 26. Asso dough fed to the rotary measuring cylinder 21 pushes the plunger 22 which switches the valve 23 in the position shown on FIG. 2 by the rod 24 and the dose controller 25. In order to provide extrusion of the part of the dough tube without filling the dose controllers 25 and 30 are adjusted so that the working stroke of the rod 24 is always longer than the stroke of the rod 29. When the portion of dough for a next item has been completed in the measuring cylinder 21 and the valve 23 has been switched, the rod 32 (FIGS. 2 and 4) is moved in the right position. The valve 33 is switched in the right position by its spring and cams 34 and 36 of the pinching device 4 are moved away. The crosshead 35 with the rocking bearing 37 is moved in the slide 38 which secured to the body of the apparatus and turns the measuring cylinders 26 and 21 around its longitudinal axis from the position shown on FIGS. 2 and 5 to the position shown on FIG. 6 by the lever 40, chain transmission 41, tubular shafts 70 and 71 which are disposed in bearings 72 and 73. When the turn of the measuring cylinders 21 and 26 have been finished, the rod 32 switches the valve 42 in the right position by frame 48. As a result, plunger 22 pushes dough through the oullet 43 of the measuring cylinder 6 to the dough inlet 44 of the die head 2 and plunger 27 pushes filling through the outlet 45 of the cylinder 7 to the filling inlet 46 of the die head 2 (FIGS. 2,3,6 and 7). The tubular outlet 81 which has thickness of an open area $\delta$ of the die head 2 provides extrusion of dough tube. The outlet 82 of the die head 2 provides extrusion of filling. The external dough tube with internal filling is extruded to the twisting device 3 which also serves as a receiving means. Simultaneous extrusion dough and filling is provided by the hydraulic series connection of the hydraulic cylinders 50 and 51. When the portion of the filling for one item has been extruded, the valve 28 is switched in the left position. This allows extruding the rest of the portion of the dough tube without filling. When the rest of the dough tube for one item has been extruded, the valve 23 is switched in the left position as a result and the rod 32 moved in the left direction and turns the rotary measuring cylinders in the position shown on FIG. 2. During its way the pawl 52 switches the hydraulic rotary spool directional control valve 47 in the other position by turn of its spool shaft 53 which has the chain transmission 54 with cams 55 on the chains (FIG. 4). The distance between two adjacent cams 55 equally half of the length of the pitch circle of the sprocket 56 which is secured to the spool shaft 53. When valve 47 has changed its position, the pistons 60 of the hydraulic actuator of the twisting device 3 changes its position and rotor 61 is turned for predetermined angle by the rack-and-gear drive 62. On FIG. 7 the twisting device is shown during the rotating of the rotor 61. As it is shown on FIG. 7, the stretchable proper shape plastic tube 63 with its ends tightly fixed in the ends of the rotor 61 forms with the rotor 61 the tubular swelling member which has the inner space 64. If the air from the source of the air pressure is supplied into the inner space 64 the stretchable tube 63 is stretched an firmly and gently embraces the item A while the rack-and-gear drive 62 turns the rotor 61 with embraced item about its axis. As a result the part of dough tube which was extruded without filling, is twisted for predetermined angle relatively an upstream part of the extruding material. It is possible in this apparatus because the part of dough tube without filling is self-vacuumed. More detailed description of the twisting device 3 is in my U.S. Pat. No. 4,624,030. The advantage of this apparatus is that the source of air is connected with inner space 64 through openings 65 in any intermediate position of the pistons 60, but source of vacuum is connected with inner space 64 through opening 66 in two extreme positions of the pistons 60. In these positions the source of air pressure is closed by non-perforated part of the rotor 61. When the inner space 64 is vacuumed, the stretchable tube 63 is removed from the Item A and attracted to the inner surface of the rotor 61 so that the Item A is released. Before that happens, the rod 57 (FIG. 4) which is secured to the crosshead 35 switches the valve 33 in the position shown on FIG. 2 and the cams 36 and 34 form, close and separate ends of the items.

In order to simultaneously extrude external dough with internal filling, it must be observed following relationships (FIGS. 3 and 7):

$$\frac{4 \cdot D \cdot \delta}{(D - \delta)^2} = \frac{d_d^2}{d_f^2}$$

here: $D = D_e - \delta$ wherein $D_e$ is the external diameter of the open area of the dough outlet of the die head.

$\delta$ is the thickness of the open area of the dough outlet of the die head.

$d_d$—diameter of the plunger 22

$d_f$—diameter of the plunger 27

Longitudinal dimensions of the Item A are adjusted by dose controllers 25 and 30 (FIGS. 2,8 and 9) which include the frames 74 with internal thread 75, the nuts 76. The frames 74 are secured to stems of valves 23 and 28. The right ends of rods 24 and 29 pass through plain bearings 77 and have heads 78. Disposed distance between the head 78 and the nut 76 in the dose controller 25 (when the rod 24 is in extreme left position) corresponds to portion of dough tube for one item. Disposed distance between the head 78 and the nut 76 in the dose controller 30 (when the rod 29 is in extreme left position) correspond to portion of filling for one item.

Figure 11:
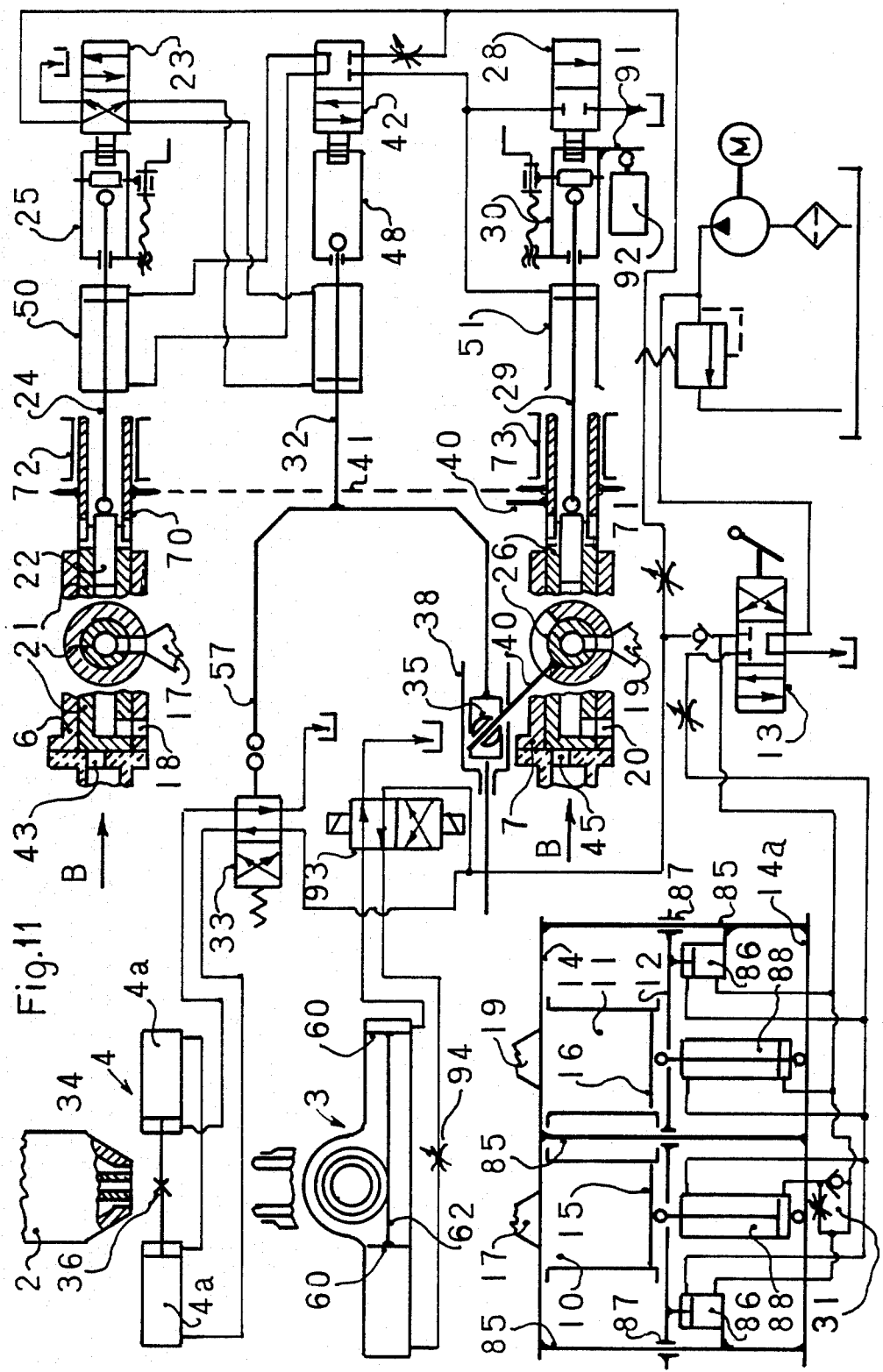

Another version of the apparatus schematically shown on FIG. 11 operates in the same manner as the apparatus shown on FIG. 1 through FIG. 10, performs the same steps of the working cycle until the portion of the filling for one item has been extruded and the valve 28 is switched in the left position that is allowed to extrude the rest of the portion of the dough tube without filling. At the same time, when the valve 28 is swithhed in the left position, the cam 91 pushes the button of the electric push-button switch 92 and by that solenoid operated directional control valve 93 is changed in position, the piston 60 of the hydraulic actuator of the twisting device 3 changed its position and rotor 61 is turned for some angle by the rack-and-gear drive 62 together with embraced item as it was described in the previous embodiment of the apparatus. Thus, while the portion of the dough tube is extruding without filling, it is twisting by turning just extruded dough tube with internal filling around axis of extrusion. The speed of the revolution of the rotor 61 (FIG. 7) is controlled by the restriction 94. As a result, the part of dough tube which was extruded without filling became twisted for some angle relatively an upstream part of the extruding material. It is possible because the part of the dough tube which has been extruded without filling is self-vacuumed. In the following this version of the apparatus is worked as the previous version of one.

The invention is not limited to the details show since various modifications and structural changes are possible without departing from the spirit of the present invention. What is desired to be protected by letters patent is set forth in the appended claims.

What I claim is:

1. In the method of forming filled dough product comprising steps of providing outwardly directable tubular dough source in relation to axis of extrusion, providing outwardly directable filling source inside of said dough source, providing means for pinching and separating of ends of the extruding items down stream of said sources, providing means for receiving just extruded item downstream of said pinching means, simultaneously extruding predetermined quantity of dough tube from said dough source and internal filling from said filling source to said receiving means through said pinching means, interrupting the extrusion of filling from said filling source and continuing the extrusion of the additional part of dough tube from said dough source, interrupting the extrusion of dough tube from said source; the improvement includes the followng steps: after said additional part of dough tube for one item has been extruded, twisting it through turning a just extruded dough tube with internal filling around axis of extrusion for some angle, relatively an upstream part of the extruding material, by internal filling around of extrusion for some angle by receiving means; forming, closing and separating of two adjacent ends of two adjacent items in the place of the twisted part of said dough tube by said pinching means.

2. In the method of forming filled dough product comprising steps of providing outwardly directable tubular dough source in relation to axis of extrusion, providing outwardly directable filling source inside of said dough source, providing means for pinching and separating of ends of the extruding items downstream of said sources, providing means for receiving just extruded item downstream of said pinching means, simultaneously extruding predetermined quantity of dough tube from said dough source and internal filling from said filling source to said receiving means through said pinching means, interrupting the extrusion of said filling from said filling source; the improvement includes the following steps: continuing the extrusion of an additional part of dough tube without filling from said dough source and simultaneously twisting said additional part through turning a just extruded dough tube with internal filling around axis of extrusion for some angle relative to an upstream part of the extruding material by receiving means; forming, closing and separating of two adjacent ends of two adjacent items in the place of the twisted part of said dough tube by said pinching means after said additional part of dough tube for one items has been extruded and twisted.

* * * * *